United States Patent
Geise

(10) Patent No.: US 10,704,906 B2
(45) Date of Patent: Jul. 7, 2020

(54) METHOD FOR PRODUCING A PENDULUM ARRANGEMENT OF A PENDULUM LASER DEVICE, AND PENDULUM LASER DEVICE

(71) Applicant: Robert Bosch GmbH, Stuttgart (DE)

(72) Inventor: Stephan Geise, Ruethen (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 15/775,890

(22) PCT Filed: Nov. 18, 2016

(86) PCT No.: PCT/EP2016/078098
§ 371 (c)(1),
(2) Date: May 14, 2018

(87) PCT Pub. No.: WO2017/093044
PCT Pub. Date: Jun. 8, 2017

(65) Prior Publication Data
US 2018/0328730 A1    Nov. 15, 2018

(30) Foreign Application Priority Data

Nov. 30, 2015    (DE) .................. 10 2015 223 643

(51) Int. Cl.
*G01C 15/00*    (2006.01)
*F16C 33/10*    (2006.01)
(Continued)

(52) U.S. Cl.
CPC ........ *G01C 15/004* (2013.01); *B29C 45/0017* (2013.01); *B29C 45/1671* (2013.01);
(Continued)

(58) Field of Classification Search
CPC ........................ G01C 15/0047; G01C 15/00
(Continued)

(56) References Cited

U.S. PATENT DOCUMENTS 5,459,932 A * 10/1995 Rando .................. G01C 15/002
                                                           33/291
5,524,352 A *  6/1996 Rando .................... G01B 11/26
                                                           33/291
(Continued)

FOREIGN PATENT DOCUMENTS

DE    29 17 856 A1    11/1980
DE    42 10 824 A1    10/1993
(Continued)

OTHER PUBLICATIONS

International Search Report corresponding to PCT Application No. PCT/EP2016/078098, dated Feb. 6, 2017 (German and English language document) (7 pages).

*Primary Examiner* — Christopher W Fulton
(74) *Attorney, Agent, or Firm* — Maginot, Moore & Beck LLP

(57) ABSTRACT

A method for producing a pendulum arrangement of a pendulum laser device includes producing a universal joint of a pendulum of the pendulum arrangement by forming two orthogonal, at least partially micro-structured shafts via plastic injection moulding and positioning at least two bearing shells on the at least partially micro-structured regions of at least one shaft of the universal joint. The method further includes producing an optic carrier of the pendulum of the pendulum arrangement as a single piece with the bearing shells by overmoulding at least two bearing shells surrounding a shaft of the universal joint via plastic injection moulding. The optic carrier is connected to the universal joint such that it is configured to rotate about the one shaft.

14 Claims, 9 Drawing Sheets

(51) Int. Cl.
  *B29C 45/16* (2006.01)
  *B29C 45/00* (2006.01)
  *F16C 11/04* (2006.01)
  *F16D 3/40* (2006.01)
  *F16D 3/41* (2006.01)
  *B29C 45/14* (2006.01)

(52) U.S. Cl.
  CPC .......... *F16C 11/045* (2013.01); *F16C 33/104* (2013.01); *F16C 33/1065* (2013.01); *F16D 3/40* (2013.01); *F16D 3/41* (2013.01); *B29C 45/1459* (2013.01); *B29C 2045/1673* (2013.01); *F16C 2208/20* (2013.01); *F16C 2208/82* (2013.01); *F16C 2208/90* (2013.01); *F16C 2220/04* (2013.01)

(58) Field of Classification Search
  USPC ..................................................... 33/286, 291
  See application file for complete search history.

(56) References Cited

U.S. PATENT DOCUMENTS

| | | | | |
|---|---|---|---|---|
| 5,754,582 | A * | 5/1998 | Dong | G01C 15/004 372/107 |
| 6,384,420 | B1 * | 5/2002 | Doriguzzi Bozzo | G01C 9/16 250/548 |
| 6,493,952 | B1 * | 12/2002 | Kousek | G01C 15/004 33/286 |
| 6,922,063 | B2 * | 7/2005 | Heger | G01C 9/14 324/658 |
| 7,116,697 | B1 * | 10/2006 | Dong | G01C 15/004 372/109 |
| 2015/0369639 | A1 * | 12/2015 | Lukic | G01D 11/245 73/431 |

FOREIGN PATENT DOCUMENTS

| | | |
|---|---|---|
| DE | 198 10 447 A1 | 9/1999 |
| DE | 10 2007 039 340 A1 | 2/2009 |
| DE | 10 2007 039 343 A1 | 2/2009 |
| DE | 10 2008 041 782 A1 | 3/2010 |
| DE | 10 2008 041 783 A1 | 3/2010 |
| DE | 10 2009 016 169 A1 | 10/2010 |
| DE | 10 2014 218 185 A1 | 3/2016 |
| EP | 0 160 319 A2 | 11/1985 |
| JP | H07-158655 A | 6/1995 |
| WO | 2010/108718 A2 | 9/2010 |
| WO | 2016/156012 A1 | 10/2016 |

* cited by examiner under_g# METHOD FOR PRODUCING A PENDULUM ARRANGEMENT OF A PENDULUM LASER DEVICE, AND PENDULUM LASER DEVICE This application is a 35 U.S.C. § 371 National Stage Application of PCT/EP2016/078098, filed on Nov. 18, 2016, which claims the benefit of priority to Serial No. DE 10 2015 223 643.9, filed on Nov. 30, 2015 in Germany, the disclosures of which are incorporated herein by reference in their entirety.

BACKGROUND

The invention relates to a method for producing a pendulum arrangement of a pendulum laser device by means of plastic injection molding. Furthermore, the invention relates to such a pendulum laser device. Pendulum laser devices serve to generate optical markings, in particular laser markings, in the context of leveling, aligning, measuring and/or marking tasks.

The general structure of a pendulum laser device is known from DE 10 2007 039 343 A1. Actual embodiments of pendulum laser devices are known from DE 10 2007 039 340 A1 and from DE 10 2009 016 169 A1 and DE 421 08 24 A1.

In the case of pendulum laser devices known from the prior art, the assembling of the pendulum arrangement, in particular the pendulum used that is central to the functionality of the pendulum laser device, is performed in a multiplicity of individual steps, and with the use of a multiplicity of separately produced individual components. The components in this case are typically composed of mechanically machined cast metal, and are fastened in the guides of the structural elements provided for this purposes, in particular of a suspension, by ground pins having ball bearings. In order to ensure sufficient accuracy of alignment of an optical leveling signal emitted by the pendulum laser device, the components used, in particular the ball bearings, their guides and the suspension must be machined with high precision, so that the optical components, such as a laser-carrying pendulum, can be held and balanced with precision.

SUMMARY

The proposed production method for a pendulum arrangement of a pendulum laser device comprises at least
  a first method step, in which a universal joint of a pendulum of the pendulum arrangement is produced by means of plastic injection molding, by forming two orthogonal, at least partially microstructured shafts,
  a second method step, in which at least two bearing shells are placed on the at least partially microstructured regions of at least one shaft of the universal joint, and
  a third method step, in which an optics carrier of the pendulum of the pendulum arrangement is produced integrally with the bearing shells by overmolding, by means of plastic injection molding, at least two bearing shells surrounding a shaft of the universal joint, and is connected to the universal joint such that it can rotate about the one shaft.

Pendulum laser devices serve to generate optical markings, in particular laser markings, in the context of leveling, aligning, measuring and/or marking tasks such as occur, in particular, in the field of trades, in the application of markings to walls, or the like. In principle, pendulum laser devices make it possible to generate, in particular to project onto objects, laser markings that represent a reference that is independent of an alignment of floors, ceilings, walls or other objects, for example the vertical wall of a cabinet, but also, in particular, independent of the alignment of the housing of the pendulum laser device.

Basically, pendulum laser devices make it possible, in at least one operating state, to generate, as a reference, a laser marking aligned on the gravitational field, i.e. aligned on the direction of gravity or relative to the plumb line. In particular, the generated laser marking may be aligned, for example, horizontally and/or vertically and/or at another defined angle to the plumb line, relative to the pendulum laser device.

For this purpose, pendulum laser devices typically have a housing having at least one opening, in particular a window, at least one pendulum arrangement being arranged in the housing. The pendulum arrangement, in particular the pendulum comprised by the pendulum arrangement, is designed to hold and align at least one laser unit by means of a laser holder, the laser holder—and thus also the laser unit—being realized such that it can freely self-align on the plumb line, in particular can oscillate or swing in all directions, independently of an alignment of the housing. The laser unit, in operation, serves to generate at least one laser marking on an object.

The pendulum arrangement of the pendulum laser device has a pendulum suspension, which is disposed on the housing or on a part connected to the housing, and which allows the pendulum, arranged such that it can oscillate on the pendulum suspension, to be aligned vertically in the gravitational field, and substantially independently of the alignment of the housing. The vertical alignment of the pendulum may be realized, for example, by use of a cardanic mounting. "Substantially independently of the alignment of the housing" is to be understood to mean that there possibly exists, for the alignment of the housing, an angular range to which the functioning of the pendulum, in particular its precise alignment on the plumb line, is limited. In particular, this angular range comprises, for example, 2° to 15° from the plumb line, typically 5° to 8°. In order to shorten the build-up period of the pendulum, suspended in an oscillating manner and, insofar as technically possible, with as little friction as possible, without reducing the setting accuracy of the end position of the pendulum in the gravitational field, the pendulum may have an eddy-current damping according to the principle of the Waltenhofen pendulum. Advantageously, following positioning of the pendulum laser device, or following a shock against the pendulum laser device, the pendulum of the pendulum laser device—and thus also the laser holder, together with the laser unit—can align itself automatically with a high degree of accuracy in the gravitational field of the earth within a short time.

The laser holder serves to hold at least one laser unit. In one embodiment, the laser holder is realized integrally with the pendulum, in particular is materially bonded, connected in a force-fitting manner and/or connected in a form-fitting manner to the pendulum, in particular to an optics carrier as a constituent part of the pendulum. The laser holder also serves to align the laser unit with respect to a preferred direction, and thus also with respect to the pendulum of the pendulum laser device, and its indirect fastening to the pendulum.

The laser unit has at least one light source for generating a laser marking on an object, for example a laser, a semiconductor laser or a laser diode. Likewise, the laser unit may have optical element that shape and/or deflect a beam and/or that influence the properties of the laser radiation, in particular, for example, lenses, filters, diffractive elements, mirrors, reflectors, optically transparent disks, or the like. In particular, cylinder lenses may be used in order to realize, in a technically simple manner, a fanning-out of the laser beam, emitted by the laser source, to form a laser plane, such that, when this laser plane is projected onto an object, a line, in particular a marking line, is produced. The laser unit may additionally also have non-optical elements, for example means for adjustment and/or electronic circuits for controlling the light source and/or for controlling other components of the laser unit. In particular, the laser unit may also have a motor for rotating the light source and/or for rotating a beam-deflecting optical element, likewise suitable for generating a laser marking fanned-out in a plane, such as, in particular, in the case of so-called rotation lasers.

The design, in particular the shape and color, of the laser marking generated by means of the pendulum laser device, in particular the laser unit, may differ according to the field of application and task, inter alia, but in particular may comprise at least marking points and/or marking lines, including broken marking lines. The laser unit may also be designed to execute the laser marking in a time-variable manner, in particular, for example, flashing. "Designed" is to be understood to mean, in particular, specially "programmed", "configured" and/or "equipped". That an object is "designed" for a particular function, is to be understood to mean, in particular, that the object performs and/or executes this particular function in at least one application state and/or operating state, and/or is configured to perform the function.

Preferably, the pendulum laser device may also have a plurality of laser units, in particular two or three, which are accommodated on the optics carrier of the pendulum by means of at least one, alternatively by means of respectively one, laser holder, such that, upon alignment of the pendulum on the plumb line, a plurality of laser units, and therefore also their generated laser markings, can simultaneously be aligned in relation to the plumb line and serve as a reference. In one embodiment, the pendulum laser device may have at least two laser units, which emit laser planes that are orthogonal to each other and the projection of which onto objects generates marking lines that in each case are orthogonal to each other. Preferably in this case, a vertically aligned laser plane goes along the direction defined by the plumb line, i.e. the vertically aligned laser plane is collinear with a vector describing the force of gravity.

The pendulum laser device furthermore has a device designed to supply the pendulum laser device with electrical energy, for putting it into operation and during operation. In particular, this device is an energy storage device that is independent of the mains electricity supply, in particular an accumulator, a battery, a fuel cell, a capacitor, another type of energy storage device considered appropriate by persons skilled in the art, or a combination/augmentation thereof. In particular, rechargeable accumulators, for example having a nickel metal hydride, lithium or lithium-ion cell chemistry, are suitable for supplying energy to the pendulum laser device. Preferably, the device for supplying energy has a detachable form-fit and/or force-fit connection interface. "Detachable" in this context is to be understood to mean, in particular, non-destructively separable, in particular non-destructively separable by a user of the pendulum laser device. In one embodiment, the device for supplying energy can thus be arranged in a removable and replaceable manner on the measuring appliance. The removable device for supplying energy can be resupplied and charged with energy from the mains electricity supply, in and/or outside of the measuring appliance.

Switching the pendulum laser device on and off is effected by a switch, or an alternative element that performs this function, that is arranged, in particular, on the housing. Furthermore, further embodiments, considered appropriate by persons skilled in the art, may be provided, for example a further switch, which serves to lock the pendulum in the housing, in particular for transport purposes or for tilting the pendulum laser device after the pendulum has come to rest.

With regard to the nomenclature, it is assumed in the following that the pendulum laser device typically—but not necessarily—has a housing, at least one pendulum arrangement being arranged in the housing. The pendulum arrangement denotes the total functional device, composed of pendulum suspension arranged on the housing, or a pendulum suspension arranged on a part connected to the housing, and of a pendulum arranged such that it can oscillate on this pendulum suspension. For the purpose of obtaining the free oscillation of the pendulum, the pendulum arrangement has a suitable mounting or a joint, as a constituent part of the pendulum, which enables the pendulum to swing freely, in particular with little friction, in the gravitational field, about at least two substantially orthogonal axes. For example, such a mounting or such a joint may be realized in the form of a cardanic mounting. Besides the mounting or the joint, the pendulum of the pendulum arrangement is additionally composed of an optics carrier, for holding at least one laser unit, the holder preferably being realized by means of a laser holder in the optics carrier.

Alternatively or additionally, the basic structure of the pendulum arrangement may also be realized differently, for example in that the free swinging of the pendulum is realized by means of a suitable mounting or a joint as a constituent part of the pendulum suspension. The principles and technical teachings, essential to the invention, of the exemplary embodiments shown in the following to illustrate the advantages of the invention can clearly be transferred to any designs of the pendulum arrangement.

For the purpose of producing the pendulum arrangement of the pendulum laser device, in a first method step of the production method according to the invention, a universal joint of the pendulum of the pendulum arrangement is produced by means of plastic injection molding, by forming two orthogonal, at least partially microstructured shafts. In a second method step, at least two bearing shells are placed on the at least partially microstructured regions of at least one shaft of the universal joint, preferably pushed onto the at least partially microstructured regions of at least one shaft of the universal joint. A third method step is used to produce an optics carrier of the pendulum of the pendulum arrangement integrally with the bearing shells by overmolding, by means of plastic injection molding, at least two bearing shells surrounding a shaft of the universal joint, and thus to connect it to the universal joint such that it can rotate about the one shaft.

The universal joint of the pendulum represents an advantageous embodiment of a cardanic mounting, in which there are formed two at least partially microstructured shafts that are aligned orthogonally in relation to each other and about each of which the universal joint can execute a rotary rotational motion. The shafts in this case each define a shaft axis, which in each case defines the mid-point of the rotational motion about the associated shaft. The two shaft axes, aligned orthogonally in relation to each other, may be separated by a distance, or not separated by a distance, from each other.

The shafts are at least partially microstructured on their surface. "Microstructure" is to be understood to mean, in particular, that the material of the shafts has a microstructure on their surface and/or in regions of the shaft close to the surface. Here, a microstructure denotes a structural, in particular plastically three-dimensionally formed condition of the surface and/or of regions of the material close to the surface, in respect of a spatial arrangement, distribution, orientation, shape and/or size of the material. In particular, regions to a depth of 1 mm, preferably 0.1 mm, particularly preferably 0.01 mm, into the material represent regions close to the surface, over which the microstructure extents. In one embodiment, the microstructure may be realized in the form of a surface capillary structure.

For simplification, the "at least partially microstructured shaft" is referred to in the following as a "microstructured shaft". What is essential at this point is only that the microstructure need not necessarily cover the entire surface of the shaft, but may also be limited to a sub-region of the surface of the shaft.

The microstructure is based on the concept of using a capillary effect of a lubricant that is applied to the microstructured shafts. The capillary effect in this case is physically determined, and is due to a surface tension and/or an interfacial surface tension that is caused by contact between an liquid and capillaries such as for example, narrow tubes, gaps or cavities. Since the shaft is provided, at least partially, with a microstructure, a lubricant present in the microstructure can be held in the microstructure because of the acting capillary forces and, moreover, can be transported in a preferred direction of flow, preferably toward the friction point or bearing point.

A surface capillary structure in the form of a fully closed capillary tube structure may be provided in the surface of the shafts. Alternatively or additionally, a surface capillary structure in the form of an open capillary structure, performing substantially the same function as closed capillary tubes, may also be provided. Such a surface capillary structure may be constituted in the form of a suitable surface roughness and/or in the form of lubricant channels. In one exemplary embodiment, the surface capillary structure is realized in the form of patterns, for example in the form of transverse grooves or crosses or rings, or the like.

Owing to the exploitation of the capillary effect, the likelihood of the occurrence of inadequate lubrication of the friction point—i.e. the bearing point of the universal joint—can be reduced considerably. In particular, lubricant depletion at the bearing point of the components of the pendulum arrangement of the pendulum laser device that move relative to one another can be counteracted.

In the first method step, the universal joint of the pendulum of the pendulum arrangement is produced by means of plastic injection molding, by forming two mutually orthogonal, at least partially microstructured shafts. A first injection molding die, in particular a first injection mould, is used to form the universal joint, including the microstructured shafts. Following closing of the injection molding die, in the injection molding process a plastic material is injected into the mould and then hardened. In this way, the universal-joint injection-molded structural element is produced in an economically particularly favorable and advantageous process. In this case, the injected plastic material flows around the predefined negative form in the injection molding die, and as a result realizes the shape defined by the injection molding die. In particular, in this case the microstructure of the waves, in particular a surface capillary structure, is also formed as a result of the flow of material around a negative structure of the first injection molding die. At least two orthogonal shafts, each having at least one microstructured region, are formed, and from then on define the two mutually orthogonal shaft axes of the universal joint.

In particular, the injection molding die is designed, in particular shaped, to execute the first method step, in order to ensure the production of the universal joint in the production method according to the invention.

Advantageously, in the first method step a particularly precisely formed universal joint is produced, with reduction of production tolerances. In addition, a particularly stable universal joint is realized, which, in particular, has long-term stability, is stable against mechanical influences and stable against thermal fluctuations. Likewise, owing to the simple production of the universal joint in the production method according to the invention, which dispenses with the assembling of a multiplicity of individual parts, production of the universal joint can be realized inexpensively and rapidly, and therefore particularly economically.

The universal joint of the pendulum of the pendulum arrangement that is produced in the first method step is then taken from the first injection molding die and used further in the second method step according to the invention. In this step, at least two bearing shells are placed or arranged, preferably pushed, onto the at least partially microstructured regions of at least one shaft of the universal joint.

A bearing shell means, in particular, an annular bearing, also called a bearing ring, that serves to realize a sliding-contact bearing. Preferably, when the bearing shell has been arranged on a shaft of the universal joint, a frictional resistance between the shaft and the bearing shell, preferably between the shaft and the optics carrier of the pendulum arrangement, is advantageously reduced. Use of such bearing shells in combination with a lubricant makes it possible to realize a particularly smooth, in particular virtually frictionless, rotational motion of the universal joint about the respective shaft axis. In one embodiment, the bearing shells on the shafts are used in such a manner that an inner region of the bearing shell can rotate relative to a shaft of the universal joint—or the shaft can rotate relative to the bearing shell—while the outer region of the bearing shell is fixedly connected to another constituent part of the pendulum suspension that is to be mounted such that it can rotate freely with respect to the respective shaft axis of the universal joint. Such a constituent part may constitute, in particular, the optics carrier of the pendulum, or a constituent part of the pendulum suspension of the pendulum arrangement. It is thus possible to ensure free rotation of the universal joint about a corresponding shaft axis relative to an optics carrier fastened thereto, or relative to a pendulum suspension fastened thereto.

In the third method step of the production method according to the invention, an optics carrier of the pendulum of the pendulum arrangement is produced integrally with the bearing shells by overmolding, by means of plastic injection molding, at least two bearing shells surrounding a shaft of the universal joint, and is connected to the universal joint such that it can rotate about the one shaft. The optics carrier of the pendulum of the pendulum arrangement is constituted by that part of the pendulum of the pendulum arrangement that serves to hold and align at least one laser unit in the gravitational field. In one embodiment of the third method step, the universal joint, produced in the first method step and provided with at least two bearing shells on at least one shaft in the second method step, is inserted in a further injection molding die. Following closing of the injection molding die, a further plastic injection molding method step is performed. In this step, the shape of the injection molding die is preformed in such a manner that the injection of plastic results in an optics carrier of a desired shape that, according to the invention, is realized integrally with the universal joint, in particular is connected in a form-fitting and force-fitting manner thereto.

The injection molding die in the third method step is configured in such a manner that only the at least two bearing shells that surround a shaft of the universal joint can be wetted in the injection molding process. Thus, only these at least two bearing shells can be connected, as a part of the universal joint that is movable relative to the shaft of the universal joint, to the injection molded structural element, in particular the optics carrier, produced in the third method step. In one embodiment of the production method, the injection molding die is shaped in such a manner that, upon insertion of the universal joint, the bearing shells are positioned in the injection molding die such that the outer surfaces of the bearing shells come to lie in the free volume of the injection molding die. In this way, a material injected in the injection molding process is injected around the bearing shells, while the inner region of the respective bearing shells and the at least partially microstructured shaft remain unwetted by the injected material. After the universal joint, together with the bearing shells placed on the shafts thereof, has been positioned in the injection molding die, the latter is closed and a plastic material is injected into the mould. The plastic material overmolds, or flows around, the bearing shells in the injection molding die and, following the subsequent hardening of the plastic, causes the bearing shells to be fixedly connected to the overmolded optics carrier.

Preferably, the at least two bearing shells are thereby inseparably, in particular integrally, connected to the plastic of the optics carrier, such that separation of the two components is not possible without destruction of the universal joint structural element and/or the optics carrier structural element. "Integrally" in this sense is to be understood to mean that, in the plastic injection molding process, the plastic is connected to at least one component of the bearing shell, in particular to the outer surface thereof, in particular joined in a form-fitting and force-fitting manner, such that they do not appear as a plurality of structural elements that are joined together, and in any case can no longer be separated from one another without thereby being destroyed. In particular, "integrally" within the meaning of the description means that the optics carrier and the universal joint are not necessarily produced from one single, uniform part and/or material. Rather, the optics carrier and the universal joint are produced in the injection molding process such that they are fixedly and intimately connected to each other, in particular in a form-fitting and force-fitting manner.

The overmolding of a bearing shell with plastic means, in particular, not necessarily the complete covering of the bearing shell with plastic, but rather the connecting of a component of the bearing shell, by overmolding, spraying or injecting, and then, in particular, precision-fit hardening of the plastic. For example, an optics carrier can be connected to the bearing shell, in particular the outer surface thereof, by overmolding the outer surface of a bearing shell, following the hardening of the plastic, in such a manner that the optics carrier, the bearing shell, and thus also the universal joint, form an integral, in particular form-fitting and force-fitting, structural element. Preferably in this case, the inner surface and/or the volume surrounded by the inner surface of the bearing shell remain/remains unwetted by plastic. It can thereby be ensured that the functionality of the bearing shell, in particular a capability of the bearing shell to rotate freely relative to the shaft (and vice versa) that is surrounded by the bearing shell is not limited. As a result of the plastic being overmolded around the bearing shells of the universal joint, the universal joint and the at least two bearing shells surrounding a shaft of the universal joint are connected, as an aggregate structural element, the pendulum of the pendulum arrangement, to the injected plastic such that they cannot be separated in a non-destructive manner. The injection molding is designed, in particular shaped, to enable the optics carrier to be produced in the production method according to the invention.

Preferably, a further injection molding die is provided for execution of the third production step, in particular is shaped so as to enable production of an integral pendulum, together with optics carrier, by overmolding at least two bearing shells surrounding a shaft of the universal joint, by means of plastic injection molding.

Overmolding of a bearing shell arranged on a shaft of the universal joint makes it possible to perform a particularly defined, precise and reproducible alignment of the optics carrier relative to the universal joint, with reduction of the production tolerances. In addition, a particularly stable, in particular integral, connection is realized between the optics carrier and the bearing shell of the universal joint, which connection, in particular, has long-term stability, and is stable against mechanical influences and stable against thermal fluctuations. Likewise, owing to the simple production of the optics carrier in the production method according to the invention, which dispenses with the assembling of a multiplicity of individual parts, production of the optics carrier can be realized inexpensively and rapidly, and therefore particularly economically.

Advantageously, the invention makes it possible to produce a pendulum of a pendulum arrangement of a pendulum laser device with particularly few assembly steps and particularly few individual components. In particular, in this way, with only three method steps of the production method, it is possible to produce a pendulum in which the number of structural elements or components is minimized. Accordingly, there is no need for elaborate production of individual components or for assembling of a multiplicity of individual components, such that the production process is advantageously speeded-up and rendered economic.

In addition, production of a pendulum according to the production method according to the invention makes it possible to dispense with elaborate processing and/or adjustment steps, in which, in the process of producing the pendulum arrangement, individual components are positioned as precisely as possible and are elaborately adjusted in their guides, in a time-consuming and cost-intensive manner. Since, in the production method according to the invention, both the universal joint and the optics carrier are produced, by means of plastic injection molding, such that they build on one another and are matched to one another, there is no need to perform adjustment of positions or adjustment of jointed shafts or guides of shafts and/or ball bearings in typically elaborate machining processes. Particularly advantageously, in this way functional integration of components is performed directly in the production process, with the result that errors, in particular also production tolerances, are minimized and the production of the pendulum laser device is simplified and speeded-up in respect of correction and/or compensation of production tolerances. In particular, in the production method according to the invention, the production tolerances are under 1 mm, preferably under $1/10$ mm, particularly preferably under $1/100$ mm. The production method according to the invention therefore enables a pendulum arrangement to be produced in a particularly economic and rapid manner, but at the same time also in a particularly defined, precise and reproducible manner.

In addition, it is economically particularly advantageous that, by use of the production method according to the invention, it is possible to avoid expensive rolling bearings for mounting the optics carrier such that it can rotate relative to the universal joint.

In one embodiment of the production method according to the invention, the universal joint and/or the optics carrier are/is produced from thermosetting plastic, by means of plastic injection molding.

Thermosetting plastics (thermosets), after having hardened, have an extremely high and lasting dimensional and temperature resistance, and are therefore particularly suitable for producing the pendulum according to the invention, with the advantage of reliable and lasting adherence to the close tolerance specifications. Moreover, injected thermosetting plastic can be chemically activated and cross-linked, and thus hardened, in particular still in the injection molding die, in particular at room temperature with the aid of catalysts, or thermally at increased temperatures. In one embodiment of the production method, for example a bulk molding compound (BMC), a phenolic molding compound (PF) or an epoxy resin (EP) may be used as a thermosetting plastic. Such materials undergo chemical cross-linking at increased temperature, for example in particular at 130 degrees Celsius to 180 degrees Celsius, and can therefore advantageously be cross-linked and hardened in the injection molding die. In one embodiment, these materials are filled with reinforcing materials, for example glass fibers, carbon fibers or the like, such that a high mechanical and thermal resistance of the hardened plastic results. This high mechanical and thermal resistance imparts advantageous physical/technical properties to the produced pendulum, in particular to the universal joint and the optics carrier, in particular in respect of temperature stability and stability against mechanical influences such as shocks, impacts, vibrations or the like.

Thermosetting plastic is also a nonpolar polymer material that, in combination with a polar lubricant, results in a very pronounced capillary effect of the lubricant applied to the at least partially microstructured shafts.

In one embodiment of the production method, a thermosetting plastic is used that expands slightly during the hardening in the injection molding die and/or that can be set with a positive shrinkage. In this way, particularly close tolerances of the injection molding die can be optimally molded. Such high-precision molding of the injection molding die likewise enables the structural element to be produced, in particular the universal joint and/or the optics carrier, to be produced with great precision and within particularly close tolerance ranges. In addition, a slight mould incline of the structural element to be cast, in particular of the universal joint and/or of the optics carrier, can result in easier demoulding following hardening of the structural element.

In one embodiment, a thermoset having a short cross-linkage time is used. By use of a thermoset having a short cross-linkage time, the period for which the injection molded structural element remains in the injection molding die for hardening can advantageously be reduced, and more efficient production of the pendulum arrangement can be achieved.

In one embodiment of the production method according to the invention, the bearing shells are produced, in at least one further method step, from a thermoplastic semifinished product, in particular from an extruded Teflon or polyoxymethylene or polyketone semifinished product.

In respect of mechanical stability, thermoplastics are preferred plastics, which are advantageous for achieving and maintaining very close tolerance requirements for the structural element. Moreover, thermoplastic is characterized by the ability to absorb mechanical influences, in particular, for example, shocks and vibrations or the like. Particularly advantageously, thermosetting plastic under the influence of high temperature can expand reversibly to a slight extent, at least partially, and contract again upon cooling (shrinkage or thermal contraction).

The bearing shells can be produced, or cut, in an economically particularly advantageous manner from extruded thermoplastic semifinished product, particularly preferably from extruded Teflon or polyoxymethylene or polyketone semifinished product. In the extrusion process, bodies of any length are extruded by continuously pressing solid to viscous masses from a die orifice. These bodies, of any length, having a desired cross section—in this case preferably in the form of a tube or cylinder—can then easily be cut into bearing shells or otherwise divided.

In one embodiment of the production method, the bearing shells are heated before being overmolded by means of plastic injection molding, wherein the inner diameter of the bearing shells decreases due to thermal expansion.

In one embodiment, due to the thermal expansion of the bearing shells, their inner diameter decreases at least partially reversibly, such that the inner surface of the bearing shells lies closely around the shaft, and in particular closely around the at least partially microstructured region of the shaft surrounded by the bearing shell. In particular, owing to the thermal expansion, the bearing shell can lie closely against the shaft in such a manner that it is not possible for the bearing shell to rotate about the shaft. The bearing shell in this case covers the microstructured region of the shaft and/or preferably tightly closes off this region. In this way, advantageously, the microstructured region of the shaft can be protected against injected plastic material. The microstructure is thus not wetted by plastic material injected in the third method step, such that the microstructure is maintained without being limited.

In one embodiment of the production method, the bearing shells are cooled after having been overmolded by means of plastic injection molding, wherein a thin gap is produced in relation to the at least partially microstructured shafts, due to the thermal contraction/shrinkage.

Due to the cooling following the third method step, the material contracts back again, the inner diameter of the bearing shells reversibly increasing again accordingly, at least partially. In one embodiment, following contraction the bearing shell resumes its original shape, i.e. its shape before being heated. In particular, at least after cooling, following the third method step, the bearing shell has a thin gap in relation to the at least partially microstructured shaft. In one embodiment, the gap may already be present before heating, i.e. at room temperature, and in particular may be matched exactly to the dimensions of the shaft. In an alternative embodiment, the gap may also be produced only as a result of the thermal expansion. The gap clearance between the bearing shell and the microstructured shaft in this case is, in particular, less than 1 mm, preferably less than 0.5 mm, particularly preferably less than 0.1 mm. Due to the enlargement of the inner diameter of the bearing shells, the underlying microstructure of the shaft, surrounded by the bearing shell, advantageously becomes free again, in particular is no longer covered and/or tightly closed off by the bearing shell, because of the formation of the gap between the bearing shells and the microstructured shaft. Particularly preferably, following cooling the bearing shell is again arranged in a freely rotatable manner on the shaft.

In one embodiment of the production method, in a further method step, a lubricant is introduced into the gap between the bearing shell and the microstructured shaft.

The lubricant introduced, in the further method step, into the gap between a bearing shell and a microstructured shaft serves to produce a self-lubricating effect between the bearing shell and the shaft. Owing to the microstructure present on the shafts, in particular their surface capillary structure, the lubricant is held in the region between the bearing shell and the shaft. Preferably, a depletion of the lubricant at the bearing point between the bearing shell and the shaft is counteracted by the capillary effect of the lubricant in the microstructure. For this purpose, the microstructure has, in particular, a capillary microstructure, which is such that the lubricant present therein is transported in a preferred direction of flow, preferably toward the bearing point, owing to the acting capillary forces. Insufficient lubrication of the bearing point, or bearing point between the bearing shell and the shaft, can thus be avoided.

In one embodiment, for the purpose of defining a preferred direction of flow of the lubricant in the direction of the bearing point, the surface capillary structure is formed in such a manner that the dimensions of the surface capillary structure reduce in the direction of the bearing point, i.e. the capillaries taper in the direction of the bearing point. Since, owing to the capillary forces, the lubricant always moves in the direction of the narrower capillary portion, the lubricant thus moves in the direction of the bearing point. The smaller the dimensions subject to the action of capillary force—for example, in the case of cylinders, their inner radius—the greater are the resulting capillary forces.

In an exemplary embodiment, there is a possibility to realize the surface capillary structure by forming the latter, at least portionally, preferably entirely, of flow channels for the lubricant. In one embodiment, these are, in particular, flow channels that run linearly to the bearing region (frictional region), quite particularly preferably flow channels that run parallel. In order to define a preferred direction of flow for the lubricant, the channel width and/or the channel depth of the flow channels decreases/decrease in the preferred direction of flow, i.e. preferably toward the bearing point between the bearing shell and the shaft. In one embodiment, the flow channels are initially relatively wide and deep, for example between approximately 10 μm and approximately 100 μm wide and/or deep, and become progressively narrower and/or less deep in the direction of the preferred direction of flow. In one embodiment, the flow channels go into the frictional region in the bearing point with a width and/or depth of between approximately 1 μm and approximately 40 μm.

In an alternative or additional embodiment, the microstructure, i.e. in particular the surface capillary structure, may be realized as surface roughness, the surface roughness being provided with a gradient and decreasing in the preferred direction of flow toward the bearing point.

In one embodiment of the production method according to the invention, at least one holder is formed in the optics carrier, for holding a laser unit, by plastic injection molding, in particular by use of a means for producing an undercut.

In one embodiment, a holder of a laser unit in the optics carrier is formed during the plastic injection molding process, for example in the form of a holder extending axially through the depth of the optics carrier. This can be realized particularly easily by use of at least one means for producing an undercut, for example by use of at least one slide that is inserted in the injection molding die before the injection molding operation is performed, such that at least one undercut can thereby be produced. For example, this is effected by use of a core-pull slide. Following hardening of the injected material, the means for producing an undercut, in particular the slide, is then removed from the injection molding die, but at least from the finished injection molded structural element, such that the hardened injection molded structural element can be demoulded.

In this way, already during the process of producing the pendulum, a holder of a laser unit can be formed integrally with the optics carrier of the pendulum of the pendulum arrangement. In particular, a particularly defined, precise and reproducible production of the holder of a laser unit can be realized, with reduction of the production tolerances. In addition, subsequently there is no need for any further production steps such as, for example, machining or the like, or for further structural elements to produce the holder. Efficient, particularly rapid and economically favorable production of the holder of a laser unit is thus realized simultaneously with the production of the optics carrier.

In one embodiment of the production method according to the invention, at least one mass is connected to the optics carrier or embedded in the optics carrier for the purpose of balancing the pendulum during injection molding.

In one embodiment, during the third method step of the production method, in which the optics carrier of the pendulum of the pendulum arrangement is produced integrally with the universal joint by means of plastic injection molding, the mass for balancing the pendulum is connected to the optics carrier, or embedded in the latter, directly in the same method step, by means of overmolding the mass. For this purpose, in one embodiment of the production method, before the injection molding die is yet closed, the mass is inserted in the latter, at a suitable point in a suitable orientation. "Connect/embed by means of overmolding" is to be understood to mean, in particular, that the mass for balancing in the injection molding process is produced in a fixed and intimate manner, in particular in a form-fitting and force-fitting manner, with the optics carrier and connected thereto, such that the optics carrier and the mass do not appear as a plurality of structural elements joined to one another, and in any case can no longer be separated from one another without thereby being destroyed. "Overmolding" means, in particular, not necessarily the complete covering of the mass with plastic, but rather the stable connecting of the mass, by overmolding, spraying or injecting, and then, in particular, precision-fit hardening of the plastic, the mass for balancing being connected in a positionally stable manner to the optics carrier. Particularly advantageously, in this way balancing of the pendulum can be performed in a very precise, defined and reproducible manner already in the process of producing the optics carrier, such that subsequent time-consuming balancing with masses that subsequently have to be applied to or adjusted on the optics carrier is avoided.

Alternatively or additionally, by application of the same technical teaching, a metal for realizing an eddy-current damping, according to the principle of the Waltenhofen pendulum, can also be connected to the optics carrier or embedded in the latter directly in the same method step by means of overmolding the metal.

In one embodiment of the production method according to the invention, the optics carrier is produced, at least partially, in a multicomponent injection molding process, in particular in a multistage injection molding process, by use of metal, and in particular balanced in respect of a mass distribution.

In this way, advantageously, in the production method according to the invention, a first component can be injected into the injection molding die, while a means for producing an undercut, in particular a lateral slide or core-pull, is introduced into the injection molding die, such that the entire available space of the injection molding die is not filled with the first component. Following hardening of this first component, in particular the plastic component, the means for producing an undercut is removed from the injection molding die, in particular the lateral slide is withdrawn, such that a cavity is freed. This cavity can be used to inject a second component into the injection molding die, in particular into the freed cavity, in an immediately subsequent, further injection molding step, and thus to connect it to the first component of the already produced injection molded structural element. In one embodiment, the second component may be an injection molding compound containing metal, in a preferred embodiment for example a plastic compound containing a metal powder, which is used for positioning an additional weight at a defined point on the optics carrier. In this way, for example, a particularly finely defined and reproducible balancing of the optics carrier can be realized already in the process of producing the optics carrier, without unnecessary subsequent time-consuming balancing with masses that subsequently have to be applied to or adjusted on the optics carrier.

Alternatively or additionally, by application of the same technical teaching, a metal for realizing an eddy-current damping, according to the principle of the Waltenhofen pendulum, can also be connected to the optics carrier directly in the same method step by means of injecting a material component containing metal.

In one embodiment of the production method according to the invention, in a further method step, a pendulum suspension is produced by means of plastic injection molding, in particular is produced as a two-part intermateable structural element.

In one embodiment, the pendulum suspension is formed in such a manner that an arrangement of the universal joint can be realized by use of at least one bearing shell of the universal joint on the pendulum suspension, in such a manner that a rotary rotational motion of the universal joint about the shaft axis defined by this bearing shell is possible in at least one angular range. In particular, this is rendered possible by use of a, in particular, two-part pendulum suspension structural element that is intermateable in a stable manner. For this purpose, the intermateable pendulum suspension structural element preferably has a cavity that, for the purpose of arranging the universal joint, is suitable for comprising at least one bearing shell, at least partially, in such a manner that a stable arrangement of the universal joint onto the pendulum suspension is achieved, it being possible at the same time for the universal joint to move freely in an unrestricted manner, at least in an angular range, about the shaft axis defined by this bearing shell. In particular, this angular range is more than 15 degrees, preferably more than 30 degrees, particularly preferably more than 45 degrees.

By use of an intermateable, in particular two-part, pendulum suspension that, in a cavity between the two intermateable parts, comprises, at least partially, at least one bearing shell of the universal joint and fastens it in a stable manner, a particularly precise fastening and guiding of the universal joint, with adherence to close tolerances, can be provided in the method according to the invention for producing the pendulum suspension. In addition, the pendulum suspension can be produced in a particularly simple, reproducible, and in particular also economically advantageous and inexpensive manner by means of plastic injection molding. For the purpose of producing the pendulum suspension by means of plastic injection molding, a further, in particular third, injection molding die is formed in such a manner that, as the result of the injection of plastic, an in particular two-piece, intermateable pendulum suspension of desired shape is produced.

In one embodiment, the intermateable constituent parts of the pendulum suspension additionally have means for realizing a holding and/or latching connection in the intermated state, for example hook and eye, clips or the like.

In one embodiment of the production method according to the invention, the pendulum suspension is produced from thermosetting plastic, in particular glass-fiber reinforced thermosetting plastic, by means of plastic injection molding.

Thermoplastics in this case represent a compromise of mechanical deformability—required for stable intermating of the pendulum suspension, in particular, for example, for realizing hook and/or clip connections—and thermal and mechanical stability, which are advantageous for achieving and adhering to very close tolerance requirements for the structural element. Moreover, thermosetting plastic is characterized by the ability to absorb mechanical influences, in particular, for example, shocks and vibrations or the like. In addition, thermosetting plastic hardens under the influence of increased temperatures. In one embodiment, the thermosetting plastic may be selected, for example, as a polyamide (PA) or polybutylene terephthalate (PBT) having a 40% glass fiber component as a reinforcing material.

In one embodiment of the production method according to the invention, in a further method step, the pendulum is arranged such that it can oscillate on the pendulum suspension.

In one embodiment, the pendulum is arranged such that it can oscillate on the pendulum suspension by use of at least one bearing shell. Preferably, for this purpose the pendulum suspension encloses at least one bearing shell of the universal joint and fixes this bearing shell in respect of the outer surface thereof, the rotary mobility of the universal joint, fixed by the pendulum suspension, relative to the inner surface of the bearing shell, not being impeded, at least in an angular range. In particular, this angular range is more than 15 degrees, preferably more than 30 degrees, particularly preferably more than 45 degrees. By use of the pendulum suspension produced by injection molding, in the production method according to the invention the pendulum can be arranged on the pendulum suspension with high precision, in a particularly defined and speedy manner, with adherence to close tolerances. The use of further aids for precise adjustment and fastening, in particular also reworking and balancing of the pendulum on the pendulum suspension, are unnecessary, such that speeding-up of the production method is achieved.

By use of means for realizing a holding and/or latching connection when the pendulum suspension is in an intermated state, either a separable, or alternatively an inseparable, plug-in connection can be effected.

In one embodiment of the production method according to the invention, in a further method step, the pendulum arrangement, composed of the pendulum and pendulum suspension, is mounted in a pendulum laser device.

Advantageously, in this way, the pendulum arrangement can be mounted in a pendulum laser device in an economically particularly favorable manner, since the pendulum arrangement is already prefabricated, ready for mounting, in the previous method steps of the production method. Particularly advantageously, it is therefore possible to dispense with elaborate assembling by use of a multiplicity of individual steps and/or a multiplicity of individual structural elements and tools. Likewise, a precise alignment of the pendulum arrangement, in particular of the optics carrier of the pendulum, and of the holder, present in the optics carrier, for holding a laser unit, has already been performed in the previous method steps, such that protracted balancing of the pendulum arrangement following its mounting in a pendulum laser device is avoided. Consequently, the mounting of the pendulum arrangement in a pendulum laser device is effected in a particularly defined, precise and reproducible manner, and thus also in a particularly simple and economically advantageous manner.

Also proposed is a self-leveling pendulum laser device according to the invention, which has at least one housing, a pendulum arranged such that it can oscillate in the housing by means of the pendulum suspension, and at least one laser unit, attached to an optics carrier of the pendulum, for generating at least one optical marking, in particular produced according to the method according to the invention, wherein a universal joint of the pendulum and the optics carrier of the pendulum are realized integrally by means of plastic injection molding, and the optics carrier is connected to the universal joint such that it can rotate, in particular oscillate, about at least one shaft of the universal joint, wherein the rotatable connection is self-lubricating by use of a surface capillary structure of the at least one shaft and/or of the optics carrier.

In one embodiment of the self-leveling pendulum laser device, the universal joint of the pendulum of the pendulum arrangement has two orthogonal, at least partially microstructured shafts, wherein at least two bearing shells are placed on the at least partially microstructured regions of at least one shaft of the universal joint, and the optics carrier of the pendulum of the pendulum arrangement is realized integrally with at least two bearing shells surrounding a shaft of the universal joint, and is connected to the universal joint such that it can rotate about the one shaft.

In one embodiment of the self-leveling pendulum laser device, the bearing shells have, on their outer surface, at least one groove, which grooves prevent twisting of the bearing shell, in particular twisting of the bearing shell relative to the optics carrier. It can thus be achieved that the shaft is always guided in a precise manner, and the outer surfaces of the shaft and the inner surface of a bearing shell remain exactly on one another for optimal lubrication.

BRIEF DESCRIPTION OF THE DRAWINGS

The invention is explained in greater detail in the following description on the basis of exemplary embodiments represented in the drawings. The drawing, the description and the claims contain numerous features in combination. Persons skilled in the art will also expediently consider the features individually and combine them to form appropriate further combinations. Elements that are the same are denoted by the same references in the figures.

There are shown.

DETAILED DESCRIPTION

Figure 1:
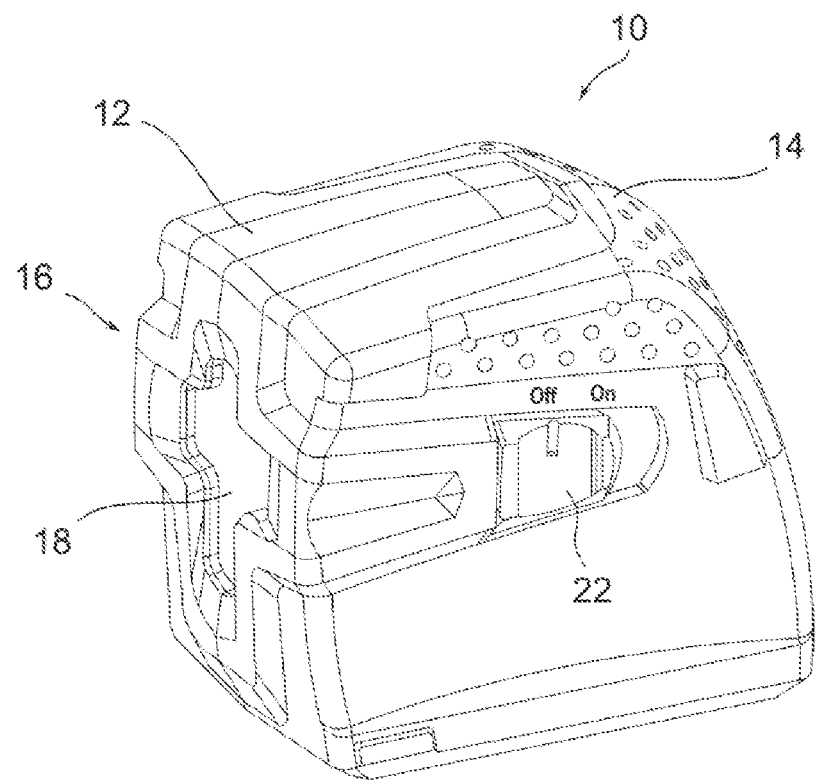
FIG. 1 perspective representation of a design of the pendulum laser device according to the invention FIG. 2 perspective representation of a design of the pendulum laser device according to the invention, in section FIG. 3a perspective representation of a design of a universal joint according to the invention, without arranged bearing shells FIG. 3b perspective representation of a design of a universal joint according to the invention, with placed bearing shells FIG. 4 schematic representation of a design of a universal joint according to the invention with bearing shells, and enlarged representation of two surface capillary structures (a, b)

The representation of FIG. 1 shows an embodiment of a pendulum laser device 10 according to the invention in a perspective side view. The pendulum laser device 10 has a substantially cubical housing 12, having edge lengths in a range of from 4 to 15 cm, advantageously in a range of from 5 to 10 cm, and particularly advantageously in a range of from 5 to 7 cm. The housing 12 is preferably composed substantially of a polymer material or a, for example fiber-reinforced, composite material (e.g. fiber-reinforced thermosetting plastic or thermoplastic). The housing 12 surrounds the mechanical components, optical and electronic structural elements (cf. in particular FIG. 2) of the pendulum laser device 10, and protects the latter from mechanical damage, and reduces the risk of contaminants. To reduce the harmful effects of shocks against the pendulum laser device 10, and for comfortable handling by the user, the housing 12 is partially covered with a soft-grip component 14. On the front side 16 of the pendulum laser device 10, an opening is provided in the housing 12, in particular an outlet opening 18. An optical signal, in particular a laser radiation emitted by a laser unit 20 arranged in the housing 12 (cf. in particular FIG. 2), for generating at least one laser marking on an object, can emerge from the housing 12 through the outlet opening 18.

The outlet opening 18 is provided with a window element (not represented in greater detail) that is transparent, but at least translucent, for the optical spectrum of the optical signal, such that the inside of the pendulum laser device 10 is protected against damage and environmental influences, for example against the ingress of moisture and dust.

On the side of the housing 12 of the pendulum laser device 10 there is a switch 22, the actuation of which activates/deactivates the electronics arranged in the housing 12, in particular the energy supply of the laser unit 20.

Not represented further in FIG. 1 is battery compartment, accommodated on the underside of the housing 12 of the pendulum laser device 10. The battery compartment, with its battery compartment cover 24, forms an essential constituent part of the surface of the housing 12. The battery compartment serves to receive batteries 26 or also accumulators for supplying energy to the pendulum laser device 10 (cf. in particular FIG. 2).

Figure 2:
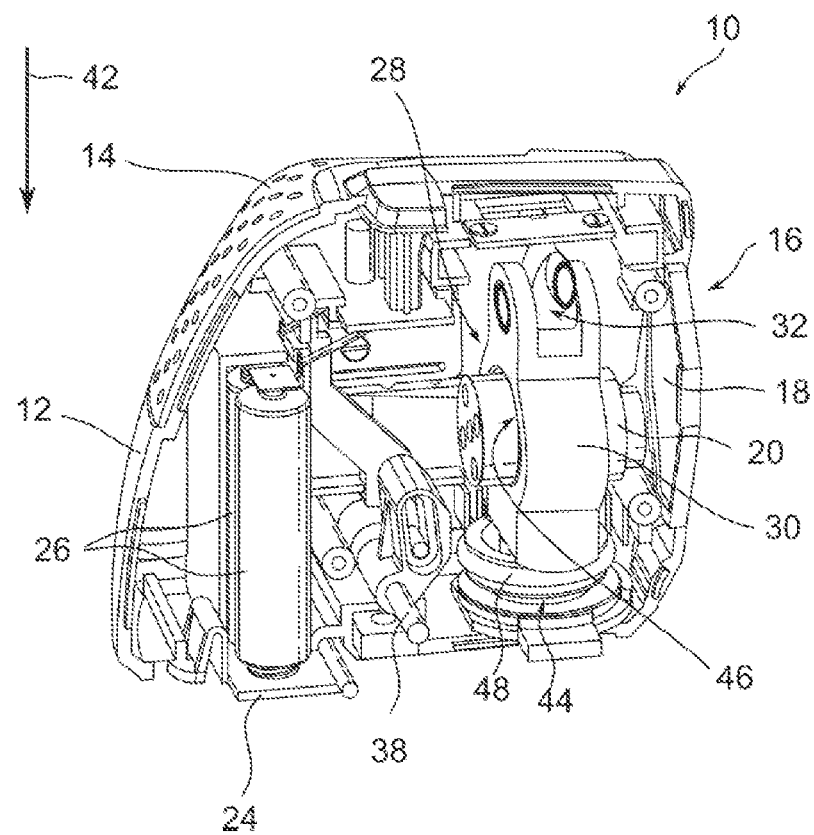

FIG. 2 shows the same embodiment of the pendulum laser device 10 from FIG. 1, in a lateral cross section. Besides the features represented in FIG. 1, the cover of the battery compartment 24 can be seen, with batteries arranged behind it, inside the housing 12 of the pendulum laser device 10. The pendulum arrangement, composed of a pendulum 28 and a pendulum suspension 34, not represented in greater detail here (for which cf. in particular FIG. 6), represents a central and functionally essential article of the pendulum laser device 10. In the embodiment represented, the pendulum 28 is composed of an optics carrier 30 and of a universal joint 32, which, by use of the pendulum suspension 34, not represented in greater detail here, and by use of bearing shells 36a, 36b (cf. in particular FIG. 3b), in particular in the form of a cardanic mounting, is fastened to the housing 12 or to a constituent part that is fixedly connected to the housing 12 of the pendulum laser device 10. The components of the pendulum 28, i.e. the optics carrier 30 and the universal joint 32 are—apart from the bearing shells 36a, 36b—produced substantially from a fiber-reinforced thermosetting plastic, by means of plastic injection molding. The optics carrier 30 serves to hold the essential optical elements of the pendulum laser device 10, in this case represented in a simplified manner, in the form of a laser unit 20. The pendulum suspension 34 is produced from thermosetting plastic by means of plastic injection molding.

If the pendulum 28 is not locked in an assumed position by means of a locking device 38, the pendulum 28 aligns itself in a self-leveling manner about two axes, in particular about two shaft axes 40a, 40b of the universal joint 32 (cf. in particular FIG. 3a, 3b), in particular independently of the alignment of the housing 12, freely in all directions in the gravitational field of the earth. The angular range of the alignment of the housing 12 in which the self-leveling property of the pendulum 28, in particular its precise alignment on the plumb line 42, is achieved, comprises, in particular, 5 degrees to 15 degrees from the vertical, typically 5 degrees or 8 degrees. If the pendulum laser device 10 is switched on, the laser unit 20 emits optical signals, in particular at least one laser plane, which emerges from the housing 12 through the outlet opening 18, to generate an optical marking, in particular at least one marking line, on an object (for reasons of clarity, a representation of the wiring of the laser unit 20 has been omitted).

In order to shorten the build-up period of the pendulum 28 suspended, insofar as technically possible, with as little friction as possible, without reducing the setting accuracy of the end position of the pendulum 28 in the gravitational field, the pendulum 28 has an eddy-current damping 44 according to the principle of the Waltenhofen pendulum. It is thus advantageously achieved that the pendulum 28 of the pendulum laser device 10—and therefore also the optics carrier 30, together with the laser unit 20—following positioning of the pendulum laser device 10, or following a shock against the pendulum laser device 10, aligns itself with a high degree of accuracy, of a few tenths of a millimeter, in the gravitational field of the earth within a short time, in particular within 0.5 to 5 seconds. In particular, the device for eddy-current damping 44 has a metal plate 48 on the underside of the pendulum 28, in particular of the optics carrier 30, which is realized integrally with the latter, in particular connected in a form-fitting and force-fitting manner, by means of injection molding.

The holder 46 of the pendulum 28 of the pendulum laser device 10 serves to hold and precisely align the laser unit 20 in relation to the pendulum 28 of the pendulum laser device 10 and—since the pendulum aligns itself freely according to gravitational field—in relation to the plumb line 42. In the exemplary embodiment represented, the laser unit 20 is inserted in a holder 46 that extends axially through the main body of the optics carrier 30 (cf. in particular also FIG. 5), and is connected to the holder 46 in a stable manner by fastening means, not represented in greater detail. It is to be noted in particular that, in an alternative embodiment of the holder 46, the laser unit 20, or also a plurality of laser units 20, may also be arranged in a materially bonded and/or form-fitting manner at, in or on the optics carrier 30.

The laser unit 20 is not limited to the generation of a special type of optical marking. In particular, the laser unit 20 may be designed to generate punctiform and/or linear optical markings on objects, more precisely to project punctiform and/or linear optical markings onto objects, or any combinations of such. Moreover, the exemplary embodiment represented in FIG. 1 and FIG. 2 is not limited to the use of a holder 46 in combination with a laser unit 20. In an alternative embodiment of the pendulum laser device 10, for example a plurality of holders 46', in particular aligned to one another, which in turn each have a laser unit 20', may also be provided and produced by use of the same method according to the invention for producing the pendulum arrangement.

Figure 3A:
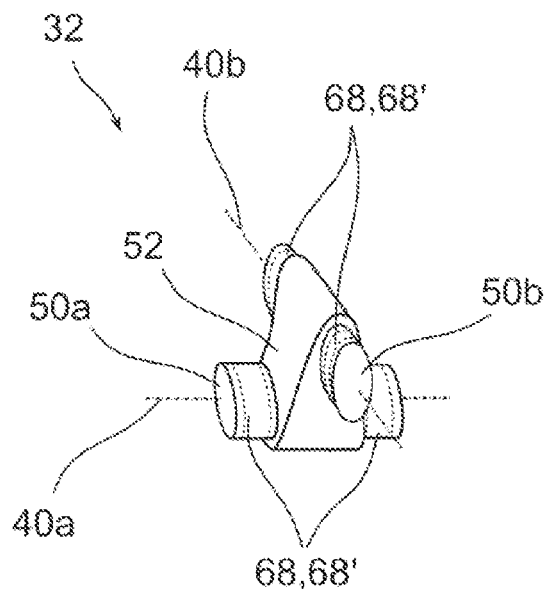
Figure 3B:
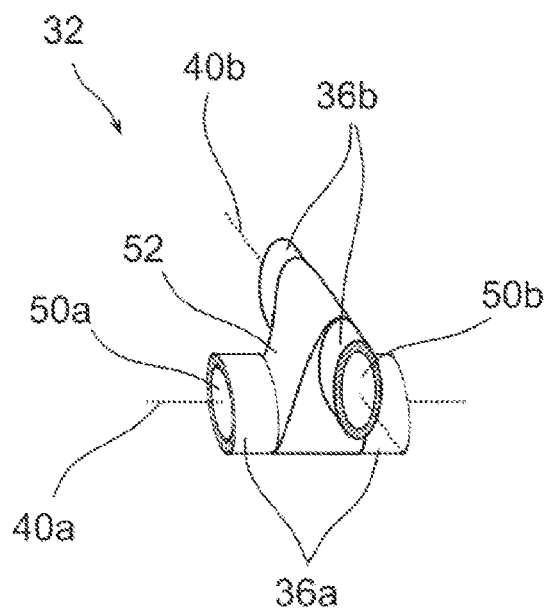
Figure 4:
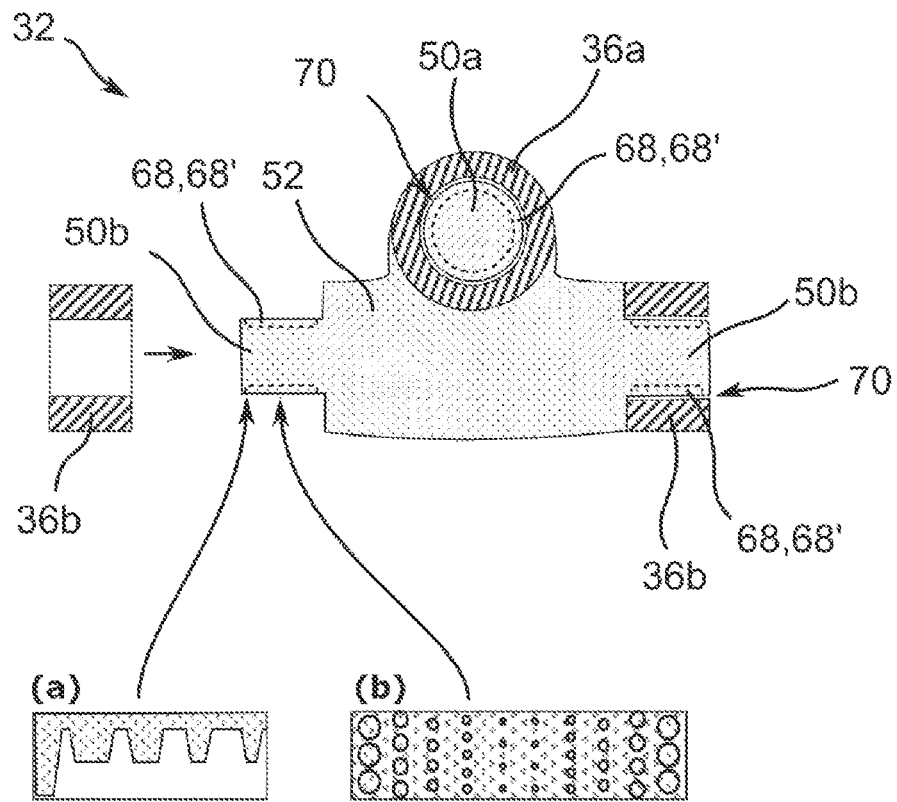

A universal joint 32 of the pendulum 28 of the pendulum arrangement is represented in FIG. 3a and FIG. 3b—in FIG. 3a without placed, or arranged, bearing shells 36a, 36b, in FIG. 3b with bearing shells 36a, 36b placed, in particular pushed onto, the shafts 50a, 50b. FIG. 4 shows a schematic cross section of the embodiment of the universal joint from FIGS. 3a and 3b (size ratios not true to scale, in particular in respect of the depth of the surface capillary structure 68'). The universal joint 32 of the pendulum 28 is produced in the production method according to the invention by means of plastic injection molding, by forming a main body 52 and two mutually orthogonal, at least partially microstructured shafts 50a, 50b. A representation of the method of production of the universal joint 32 is given in FIG. 7.

The microstructure 68 (in the following also synonymous with "microstructured region 68") is realized in the form of a surface capillary structure 68' in a region on the shafts 50a, 50b (inside the dashed lines, cf. in particular FIG. 3a and 50b. FIG. 4). The region of the surface capillary structure 68' in this case is at a distance of, for example, 1 mm from the edge of the shafts 50a, 50b in the axial direction. The surface capillary structure 68' serves to receive lubricant (not represented in greater detail here) introduced between the bearing shell 36a, 36b and the microstructured shaft 50a, 50b. Following the completion of the pendulum arrangement of the pendulum laser device 10, the lubricant is introduced, in particular injected, in a further method step, into a gap 70 between two bearing shells 36a, 36b and the shaft 50a, 50b. Due to the microstructure 68 present on the shafts 50a, 50b, in particular the surface capillary structure 68' thereof, the lubricant is held in the region between the bearing shell 36a, 36b and the shaft 50a, 50b. As a result of the capillary effect of the lubricant in the surface capillary structure 68', depletion of the lubricant at the friction point between the bearing shell 36a, 36b and the shaft 50a, 50b of the completed pendulum laser device 10 is counteracted.

Figure 5:
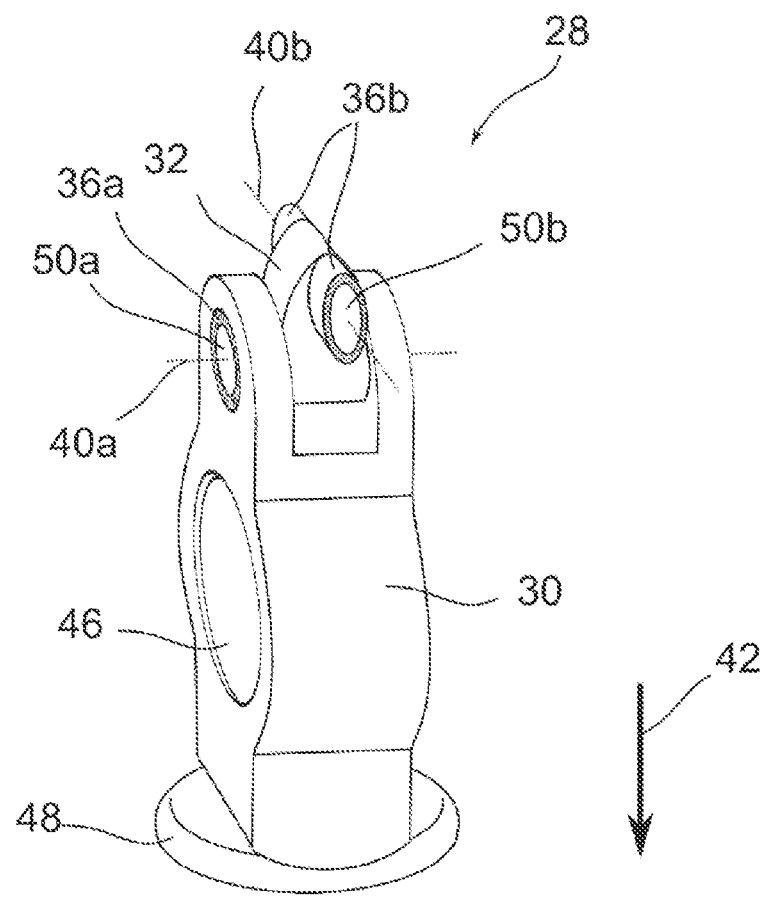
FIG. 5 perspective representation of a design of a pendulum according to the invention FIG. 6 schematic view of a section of a design of a pendulum suspension, on which a pendulum is arranged FIG. 7 method diagram of a design of the production method according to the invention, FIG. 8 schematic sectional view of a design of a first injection molding die, in which there is a hardened universal joint FIG. 9 schematic sectional view of a design of a further injection molding die, in which there are a universal joint, with bearing shells, and an optics carrier realized integrally with the universal joint
Figure 9:
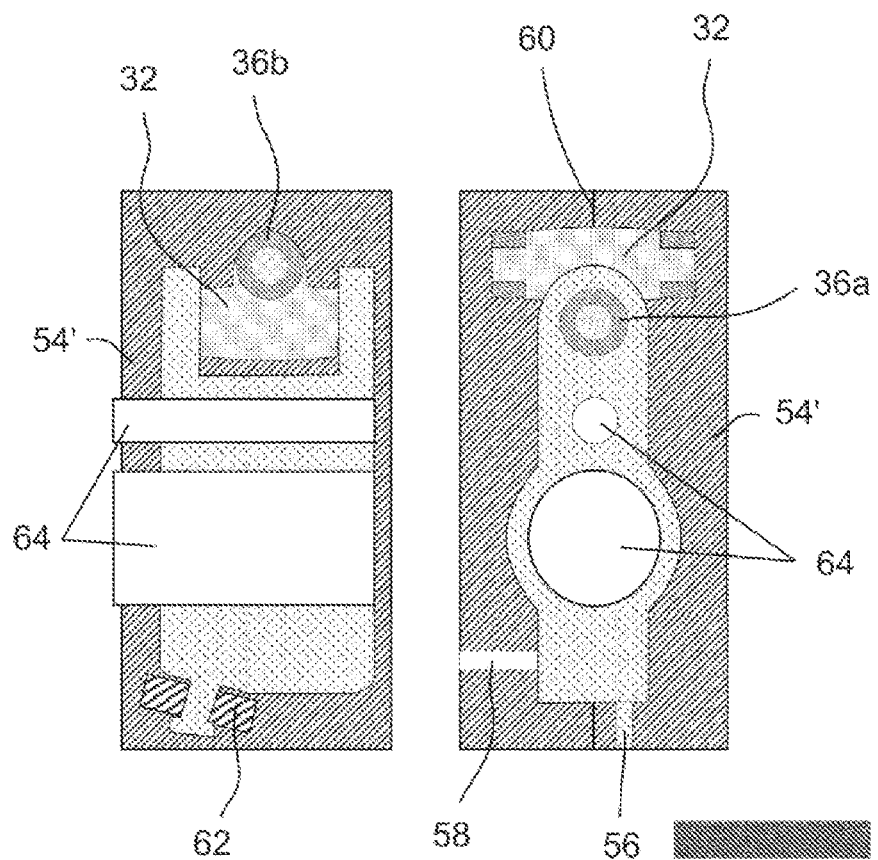

In FIG. 3b and FIG. 4, the bearing shells 36a, 36b—as also in the exemplary embodiments shown in FIGS. 2, 5 and 9—are realized as annular sliding-contact bearings and, in a further method step (cf. in particular FIG. 7), are cut from a Teflon material, not represented in greater detail here, extruded in the form of a tube. The bearing shells 36a, 36b in this case have an inner surface and an outer surface, having an inner diameter and outer diameter, respectively. In addition, the bearing shells 36a, 36b each have at least one groove 74 (cf. in particular FIG. 6). In the second method step according to the invention, the bearing shells 36a, 36b are pushed onto the at least partially microstructured regions 68 of both shafts 50a, 50b of the universal joint 32 (indicated by an arrow in FIG. 4). In FIG. 3b, the bearing shells 36a, 36b are in an arranged state on the shafts 50a, 50b of the universal joint 32. In this case, as shown in FIG. 4 (right side), the bearing shells 36a, 36b project completely over and cover, or cover over, the microstructured region 68 of the shafts 50a, 50b. The bearing shells 36a, 36b have an inner diameter that is 0.2 mm greater than the outer diameter of the shafts 50a, 50b. Consequently, there is a thin gap 70, of 0.2 mm, between the shafts 50a, 50b and the bearing shells 36a, 36b when the bearing shells 36a, 36b are in the arranged, or pushed-on, state.

The bearing shells 36a, 36b, in combination with the lubricant applied to the microstructure 68, in particular to the surface capillary structure 68', enable the universal joint 32 to effect the particularly smooth, in particular virtually frictionless, rotational motion about the shaft axes 40a, 40b defined by the two bearing shells 36a, 36b.

Exemplary embodiments of a surface capillary structure 68' is also shown in FIGS. 4a and 4b. FIG. 4a in this case shows a side view of the surface capillary structure 68' of the shaft 50b toward the edge region thereof (sealing of the shaft 50b). FIG. 4b represents a top view of the surface capillary structure 68' of the shaft 50b in a middle region of the surface capillary structure 68'. According to the representations, the surface capillary structure 68' is composed of a multiplicity of elevations in the form of domes. The diameter of the domes decreases inward (right arrow) as the distance from the outer edge of the shaft 50b (left arrow) of the universal joint 32 increases, and then increases again, the distance of adjacent rows of domes, i.e. the distance of the mid-points of the rows formed from respectively identical domes, being constant. In this exemplary embodiment, the flow channels formed by the domes are relatively wide inside the surface capillary structure 68', having distances of between approximately 50 μm and approximately 100 μm, while the flow channels toward the outer region (left and right end of the region 68,68') of the surface capillary structure 68' become progressively narrower, such that, there, there re flow channels having a width of between approximately 1 μm and approximately 40 μm. At the outermost end of the surface capillary structure 68' there is a raised barrier, which acts to prevent the lubricant flowing out of the surface capillary structure 68'.

FIG. 5 shows a perspective representation of an embodiment of the pendulum 28, composed of a universal joint 32, an optics carrier 30, and of a metal plate 48, for from balancing the pendulum 28 and which also simultaneously serves as a counter-piece of an eddy-current brake 44 (cf. FIG. 2). The optics carrier 30 can rotate in freely movable manner, in at least one angular range, about the shaft axis 40a of the universal joint 32, i.e. is mounted such that it can oscillate, this angular range comprising, in particular, more than 15 degrees, preferably more than 30 degrees, particularly preferably more than 45 degrees. A holder 46 extends axially through the depth of the optics carrier 30. The holder 46 serves to hold and fasten a laser unit 20 on the optics carrier 30. The optics carrier 30 of the pendulum 28 of the pendulum arrangement is produced integrally, preferably in a form-fitting and force-fitting manner, with the universal joint 32, in particular with two bearing shells 36a, 36b surrounding a shaft 50a (cf. also FIG. 3b), from plastic, preferably from reinforced thermosetting plastic, by means of injection molding by application of the production method according to the invention. The holder 46 is formed in the same method step of the production method according to the invention, by use of at least one means for producing an undercut, by means of plastic injection molding. The pendulum 28 shown in FIG. 5 is arranged on a pendulum suspension 34, not represented in greater detail here, likewise such that it can oscillate freely about the shaft axis 40b of the shaft 50b, in at least one angular range (cf. in particular FIG. 6). A representation of the method of production of the optics carrier 30 is given in FIG. 7 and FIG. 9.

Figure 6:
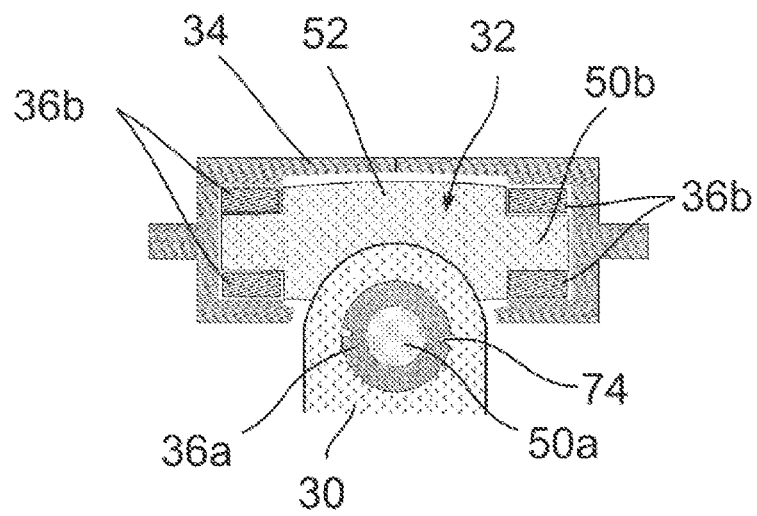

Represented in FIG. 6 is a schematic section that shows the universal joint 32 with two mutually orthogonal shafts 50a, 50b and the bearing shells 36a, 36b attached thereto, as well as the beginning of an optics carrier 30 realized integrally on bearing shells 36b. For the purpose of arranging the pendulum 28 on the housing 12 of the pendulum laser device 10, the shaft 50b, together with free bearing shells 36b of the universal joint 32, is comprised by two components of the pendulum suspension 34 in such a manner that fixing of the bearing shells 36b in the pendulum suspension 34 is achieved without the free rotary motion capability of the universal joint 32 about the shaft 50b being impaired, at least in an angle range. This angle range comprises, in particular, more than 15 degrees, preferably more than 30 degrees, particularly preferably more than 45 degrees. The pendulum suspension 34 is produced in the production method according to the invention by means of plastic injection molding, preferably from fiber-reinforced thermosetting plastic, in particular as a two-part intermateable structural element. The intermateable components of the structural element have means, not represented in greater detail, for realizing and hook and/or latching connection. The production method according to the invention for producing the pendulum suspension 34 is represented in greater detail in FIG. 7.

Figure 7:
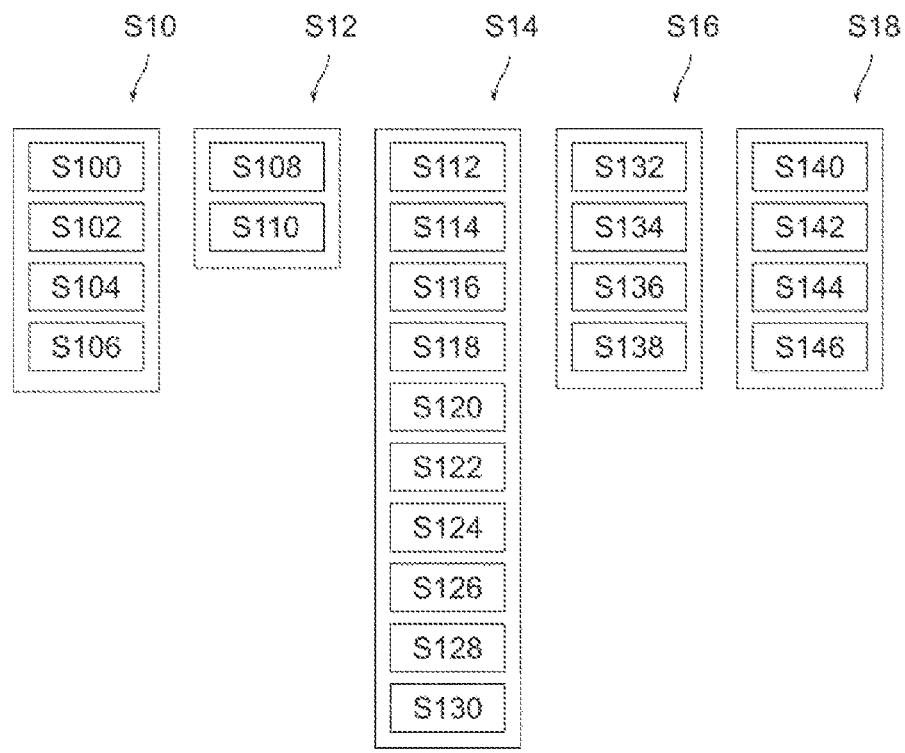

FIG. 7, in a schematic method diagram, shows the essential method steps of the production method according to the invention. In a first method step S10, which in turn in subdivided into method sub-steps S100 to S106, a universal joint 32 of the pendulum 28 of the pendulum arrangement is produced by means of plastic injection molding, by forming two orthogonal, at least partially microstructured shafts 50a, 50b. In the embodiment of the first method step S10 that is represented, the injection molding die 54 is first closed, in the method sub-step S100. Then, in method sub-step S102, by use of an injection nozzle, in particular fiber-reinforced thermosetting plastic, for example, bulk molding compound (BMC), a phenolic molding compound (PF) or an epoxy resin (EP) is injected into the cavity of the injection molding die 54, the plastic filling the available space of the cavity. In this case, the plastic flows around negative forms of the injection molding die 54 and is thus molded therefrom. In particular, in this method sub-step, the surface capillary structure 68' is also molded, as a materially bonded constituent part of the shafts 50a, 50b. Following completion of the injection process (method sub-step S102), the injected plastic, in particular the thermoset, hardens, under the influence of temperature, in particular increased temperature (method sub-step S104). In this way, the thermoset is thermally activated and chemically cross-linked at increased temperature, in particular between 130 degrees Celsius and 180 degrees Celsius, such that a structural element of high mechanical and thermal resistance results. Finally, following cooling of the injection molding die 54, the latter is opened again, in method sub-step S106, and the finished universal joint 32 is removed from the injection molding die 54.

In one embodiment of the production method, a thermoset is used that expands slightly in the injection molding die 54 during the hardening in method sub-step S104, and/or that is set with a positive shrinkage. In this way, particularly close tolerances of the injection molding die 54 can be molded optimally. Such a high-precision molding of the injection molding die 54 likewise enables the structural element to be produced, in particular the universal joint 32 and/or the optics carrier 30, to be produced very precisely and within particularly close tolerance ranges in the method step S16.

In one embodiment, a thermoset having a short cross-linkage time is used. The period that the injection molded structural element remains in the injection molding die 54 for hardening in the method sub-step S104 can therefore advantageously be reduced, and a more efficient production process can be achieved.

Figure 8:
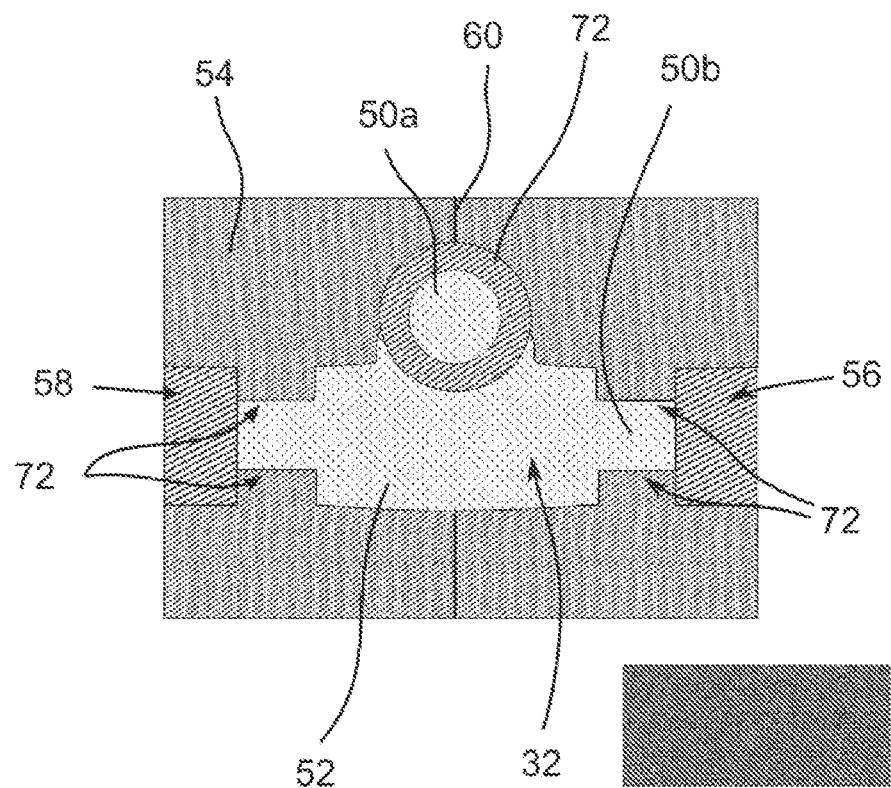

At this point reference is to be made in particular to FIG. 8 which, in a schematic sectional representation, shows an injection molding die 54, in which there are four (micro) structured regions 72 as a negative form of the surface capillary structure 68' to be realized. Two of these regions 72 are located directly on the injection side 56 and on the outlet side 58 of the injection molding die 54. FIG. 8 additionally shows one of possibly a plurality of parting planes 60 of the injection molding die 54, which is used in the method sub-step S106, for opening the injection molding die 54 and thus for removal of the finished universal joint 32. FIG. 8 shows the injection molding die 54 in the production method according to the invention at the time of the first method step S10, more precisely during the hardening of the thermosetting plastic in the method sub-step S104.

FIG. 7 additionally shows a second method step S12, with the method sub-steps S108 to S110. In the method sub-step 108, the bearing shells 36a, 36b are cut from a tubular Teflon semifinished product. The bearing shells 36a, 36b in this case have at least one groove 74 (cf. in particular FIG. 6). Then, according to the invention, in the method sub-step S110 the thus prepared bearing shells 36a, 36b are placed on, in particular pushed onto, the at least partially microstructured regions 68 of at least one shaft 50a, in this case both shafts 50a, 50b, of the universal joint 32 (cf. in particular also FIG. 4). A respective gap 70 of, in particular, 0.2 mm is in this case produced between the shafts 50a, 50b.

In the third method step S14 of the production method according to the invention, the optics carrier 30 of the pendulum 28 of the pendulum arrangement is produced integrally with the bearing shells 36a by overmolding, by means of plastic injection molding, two bearing shells 36a surrounding the shaft 50a of the universal joint 32, and is connected to the universal joint 32 such that it can rotate about the one shaft 50a. For this purpose, in a first method sub-step S112, the universal joint 32 produced in the first method step S10 is inserted in a further, in particular second, injection molding die 54. Likewise, further components of the optics carrier 30, in particular, for example, a mass 62 for balancing the pendulum 28, or a metal plate 48 as a constituent part of an eddy-current brake 44, or other components that are necessary or appropriate for the optics carrier 30, may also be inserted in the method sub-step S112. Then, in method sub-step S114, the injection molding die 54' is closed. To enable a holder 46 for holding a laser unit 20 in the optics carrier 30 to be formed during the injection molding process, a slide 64, as a means for producing an undercut, is introduced laterally into the injection molding 54', in method sub-step S116. In total there is thus produced in the injection molding die 54' a cavity that directly adjoins the mould boundaries of the injection molding die 54', the laterally inserted slide 64, the outer surfaces of two bearing shells 36a, and possibly further components, such as the mass 62 and/or the metal plate 48. Preferably, the cavity encloses the outer surfaces of the two bearing shells 36a completely. In method sub-step 118, the injection molding die 54 is heated, and the bearing shells 36a, 36b expand. The inner diameter of the bearing shells 36a, 36b then reduces reversibly, at least partially, such that the inner surfaces of the bearing shells 36a, 36b lie closely against the shafts 50a, 50b, and in particular closely against the regions of the surface capillary structure 68' of the shafts 50a, 50b. In particular, due to the thermal expansion, the bearing shells 36a, 36b tightly close off the microstructured regions 68 of the shafts 50a, 50b surrounded by the bearing shells 36a, 36b, such that the microstructured regions 68 are protected against injected plastic material. Then, in method sub-step S120, fiber-reinforced thermosetting plastic is injected into the injection molding die 54', by use of an injection nozzle, in order to create the optics carrier 30. The plastic, according to the form of the cavity, flows around the laterally inserted slide, the two bearing shells 36a and the possibly further components, such as the mass 62 and/or metal plate 48. Then, in method sub-step S122, the injection molding die 54' is cooled again, with both the thermosetting plastic hardening and, due to the thermal contraction of the bearing shells 36a, 36b, a thin gap 70 again being produced in relation to the microstructured shafts 50a, 50b. Following the cooling process, the bearing shells 36a, 36b are again arranged in a freely rotatable manner on the shafts 50a, 50b. In method sub-step S124, the laterally inserted slide 64 is removed again from the formed optics carrier 30. If necessary, at this point further laterally inserted slides 64', that were inserted in the injection molding die 54' to produce undercuts of the optics carrier 30, are likewise removed from the optics carrier 30. In further, in particular optional, method sub-steps, further material components can be injected into the injection molding die 54' and thus, in particular, injected onto the optics carrier 30 (method sub-step S126). Such further material components may be used, for example, for a defined balancing of the pendulum 28 or for arranging a metal plate 48 for realizing an eddy-current brake. In the optional method sub-step S128, these additionally injected components harden. If all injection process and hardening processes, in particular of various material components, are complete, the injection molding die 54 is opened again, in method sub-step S130, and the finished integral pendulum 28, composed of the universal joint 32 and the optics carrier 30, with the holder 46, and possibly with further components such as the mass 62 and/or the metal plate 48, is removed from the injection molding die 54' (method sub-step S130).

In this way, the optics carrier 30 is produced integrally with the universal joint 32 by means of plastic injection molding, such that the optics carrier 30 and the universal joint 32 are fixedly and intimately connected, in particular in a form-fitting and force-fitting manner, to each other, and do not appear as a plurality of structural elements joined to one another. The components can no longer be separated from each other without being destroyed.

Advantageously, the pendulum 28 of the pendulum arrangement of a pendulum laser device 10 is produced with particularly few assembly steps and particularly few individual components. In particular, in this way, a pendulum arrangement in which the number of structural parts or components used is reduced is produced with only three method steps S10, S12 and S14 of the production method. There is no need for elaborate production of individual components, or for assembling of a multiplicity of individual components. In addition, as a result of the pendulum 28 being produced according to the production method according to the invention, elaborate machining and/or adjusting steps, in which, in the process of producing the pendulum arrangement, individual components are positioned as precisely as possible in a time-consuming and cost-intensive manner and are elaborately adjusted in their guides, become superfluous. Since, in the production method according to the invention, both the universal joint 32 and the optics carrier 30 are produced such that they build on one another and are matched to one another, there is no need to perform adjustment of positions or adjustment of jointed shafts or guides of the shafts 50a, 50b and ball bearings in typically elaborate machining processes. In addition, production tolerances are reduced, and the production of the pendulum laser device 10 is simplified and speeded-up in respect of correction and/or compensation of production tolerances. Likewise, it is possible to dispense with costly rolling bearings for realizing the pendulum arrangement.

At this point, reference is to be made in particular to FIG. 9, which shows an injection molding die 54' in lateral section, from two orthogonal directions. Inserted in the two-part injection molding die 54', which can be separated by means of at least one parting plane 60, there is the universal joint 32 produced in the first method step S10 of the production method according to the invention. Also inserted in the injection molding die 54' is a mass 62 for balancing the optics carrier 30. Two slides 64, for creating an undercut, are introduced laterally into the injection molding die 54', so as to extend axially through the cavity of the injection molding die 54'. FIG. 9 shows an embodiment of the injection molding die 54' from the production method according to the invention at the time of the second method step S12, more precisely at the time of the hardening of the thermosetting plastic material in the injection mould 54' under increased temperature, in the method sub-step S118. The optics carrier 30 of the pendulum 28 of the pendulum arrangement is produced integrally, in particularly in a form-fitting and force-fitting manner, with the universal joint 32 by means of plastic injection molding.

FIG. 7 additionally shows, as a block diagram, a further method step S16, in which a pendulum suspension 34 is produced by means of plastic injection molding, in particular is produced as a two-part intermateable structural element. The pendulum suspension 34 is formed in such a manner that it has a cavity, formed as a result of the intermating, that, for the purpose of suspending the universal joint 32, is suitable for comprising the bearing shells 36b, at least partially, in such a manner that a stable arrangement of the universal joint 32 on the pendulum suspension 34 is achieved, it being possible at the same time for the universal joint 32 to move freely in an unrestricted manner, at least in an angular range, about the shaft axis 40b defined by the bearing shells 36b. In particular, this angular range is more than 15 degrees, preferably more than 30 degrees, particularly preferably more than 45 degrees. In addition, the two intermateable halves of the pendulum suspension 34 have means for realizing a holding and/or latching connection in the intermated state, for example hook and eye, clips or the like. The further method step S16 of the production method according to the invention comprises method sub-steps S132 to S138, in which a further, in particular third, injection molding die 54" is first closed (method sub-step S132), glass-fiber reinforced thermosetting plastic is injected into the injection molding die 54" in a further method sub-step S134, the injection molding die 54", together with the injected plastic compound, is heated, such that the thermosetting plastic is cross-linked and hardened (method sub-step S136), and then finally the pendulum suspension 34, in particular as a two-part intermateable structural element, is removed from the injection molding die 54" in the method sub-step S138.

The mounting of the pendulum arrangement in the pendulum laser device 10 is performed in a further method step S18 of the production method according to the invention. Firstly, in the method sub-step S140, the lubricant is injected between the bearing shells 36a, 36b and the shafts 50a, 50b of the universal joint 32. The lubricant in this case is uniformly distributed in the microstructured regions 68, in particular in the surface capillary structure 68', of the shafts 50a, 50b. Owing to the microstructure 68 present on the shafts 50a, 50b, in particular the surface capillary structure 68' thereof, the lubricant is held in the region between the bearing shells 36a, 36b and the shaft 50a, 50b, where it effects self-lubricating of the sliding-contact bearing. The pendulum, composed of the optics carrier 30, the universal joint 32, and possibly further components such as the mass 62 and/or the metal plate 48, is then arranged on the pendulum suspension 34 in such a manner that the cavity of the pendulum suspension 34, formed as a result of the intermating of the pendulum suspension 34, at least partially comprises the two bearing shells 36a, 36b of the universal joint 32 in such a manner that a stable arrangement of the universal joint 32 on the pendulum suspension 34 is achieved, it being possible at the same time for the universal joint 32 to move freely, at least in an angular range, about the shaft axis 40b defined by the bearing shells 36b, and therefore it is possible for the pendulum 28 to oscillate in an unrestricted manner in relation to the pendulum suspension 34, at least in an angular range (method sub-step 142). By use of the intermateable pendulum suspension, which comprises, and fastens in a stable manner, one of the two mutually orthogonal shafts 50b in a cavity between two intermateable parts, particularly precise holding and guiding of the universal joint 32 is achieved, with adherence to close tolerances, in the method according to the invention for producing the pendulum suspension. The use of further aids for precise adjustment and fastening, in particular also reworking and balancing of the pendulum on the pendulum suspension, are unnecessary. In the method sub-step S144, the laser unit 20 is placed, aligned and fastened in the holder 46 of the optics carrier 30. Finally, in the method sub-step 146, the pendulum arrangement, composed of the pendulum 28 and the pendulum suspension 34, is mounted in a pendulum laser device 10. In particular, for this purpose the pendulum suspension 34 is arranged in a stable manner on the housing 12 or on a part connected to the housing 12. The pendulum 28, mounted in such a manner such that it can oscillate in the pendulum laser device 10, can align itself vertically in the gravitational field, substantially independently of the alignment of the housing 12 of the pendulum laser device 10.

The invention claimed is:

1. A production method for a pendulum arrangement of a pendulum laser device, comprising:
   producing a universal joint of a pendulum of the pendulum arrangement by forming two orthogonal, at least partially microstructured shafts via plastic injection molding;
   placing at least two bearing shells on the at least partially microstructured regions of at least one shaft of the universal joint; and
   producing an optics carrier of the pendulum of the pendulum arrangement integrally with the bearing shells by overmolding at least two bearing shells surrounding a shaft of the universal joint via plastic injection molding, and connecting the optics carrier to the universal joint such that it is configured to rotate about the one shaft.

2. The production method as claimed in claim 1, wherein the bearing shells are produced from a thermoplastic semifinished product.

3. The production method as claimed in claim 2, wherein the bearing shells are produced from an extruded Teflon or polyoxymethylene or polyketone semifinished product.

4. The production method as claimed in claim 1, wherein the bearing shells are heated before being overmolded, and wherein the inner diameter of the bearing shells decreases due to thermal expansion.

5. The production method as claimed in claim 1, wherein the bearing shells are cooled after having been overmolded, wherein a thin gap is produced in relation to the at least partially microstructured shafts due to the thermal contraction/shrinkage.

6. The production method as claimed in claim 1, further comprising introducing a lubricant into the gap between the bearing shell and the microstructured shaft.

7. The production method as claimed in claim 1, wherein at least one holder is formed in the optics carrier via plastic injection molding, the at least one holder configured to hold a laser unit.

8. The production method as claimed in claim 7, wherein the at least one holder is formed by use of a device configured to produce an undercut.

9. The production method as claimed in claim 1, further comprising producing a pendulum suspension via plastic injection molding.

10. The production method as claimed in claim 9, further comprising arranging the pendulum such that the pendulum is configured to oscillate on the pendulum suspension.

11. The production method as claimed in claim 9, wherein the pendulum arrangement is composed of the pendulum and the pendulum suspension, the production method further comprising mounting the pendulum arrangement in a pendulum laser device.

12. The production method as claimed in claim 9, wherein the pendulum suspension is produced as a two-part intermateable structural element.

13. A self-leveling pendulum laser device, comprising:
   at least one housing;
   a pendulum suspension;
   a pendulum that includes an optics carrier attached thereto, the pendulum arranged such that the pendulum is configured to oscillate in the housing via the pendulum suspension; and
   at least one laser unit attached to the optics carrier of the pendulum and configured to generate at least one optical marking,
   wherein a universal joint of the pendulum and the optics carrier of the pendulum are configured integrally via plastic injection molding, the optics carrier connected to the universal joint such that the optics carrier is configured to rotate about at least one shaft of the universal joint, and
   wherein the rotatable connection is self-lubricating via a surface capillary structure of one or more of the at least one shaft and the optics carrier.

14. The self-leveling pendulum laser device as claimed in claim 13, wherein the optics carrier is connected to the universal joint such that the optics carrier is configured to oscillate about the at least one shaft of the universal joint.

* * * * *